(12) United States Patent
Harmsen et al.

(10) Patent No.: US 8,185,872 B2
(45) Date of Patent: May 22, 2012

(54) CROSS-PLATFORM SOFTWARE PACKAGE GENERATION

(75) Inventors: Matthew Harmsen, Los Altos, CA (US); Nang Kon Kwan, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 1337 days.

(21) Appl. No.: 11/605,519

(22) Filed: Nov. 27, 2006

(65) Prior Publication Data

US 2008/0127088 A1 May 29, 2008

(51) Int. Cl.
*G06F 9/44* (2006.01)
(52) U.S. Cl. ............... 717/121; 717/167; 717/174
(58) Field of Classification Search ............ 717/121
See application file for complete search history.

(56) References Cited

U.S. PATENT DOCUMENTS

| | | | |
|---|---|---|---|
| 5,878,422 A * | 3/1999 | Roth et al. ............... 1/1 |
| 5,953,514 A * | 9/1999 | Gochee ................ 717/138 |
| 6,230,310 B1 * | 5/2001 | Arrouye et al. .......... 717/167 |
| 6,675,382 B1 * | 1/2004 | Foster ................ 717/177 |
| 6,728,950 B2 * | 4/2004 | Davis et al. ............. 717/136 |
| 2002/0010910 A1 * | 1/2002 | Crudele et al. ........... 717/4 |
| 2002/0144248 A1 * | 10/2002 | Forbes et al. ............ 717/167 |
| 2002/0191014 A1 * | 12/2002 | Hsieh et al. ............. 345/738 |
| 2004/0015890 A1 * | 1/2004 | Wong et al. ............. 717/137 |
| 2004/0059703 A1 * | 3/2004 | Chappell et al. .......... 707/1 |
| 2004/0226004 A1 * | 11/2004 | Oldman ................ 717/136 |
| 2005/0022154 A1 * | 1/2005 | Chung et al. ............. 717/100 |
| 2005/0034121 A1 * | 2/2005 | Fisher et al. ............ 717/175 |
| 2005/0182777 A1 * | 8/2005 | Block et al. ............. 707/100 |
| 2007/0220509 A1 * | 9/2007 | Shwartz et al. .......... 717/174 |
| 2007/0226707 A1 * | 9/2007 | Catahan et al. .......... 717/136 |
| 2008/0127170 A1 * | 5/2008 | Goldman et al. ......... 717/174 |
| 2008/0127171 A1 * | 5/2008 | Tarassov ............... 717/174 |

OTHER PUBLICATIONS

Michael R. Sweet, Software Distribution Using the ESP Package Manager, Apr. 2006, "Easy Software Product" (Sweet.pdf).*
Pixelbeat.org, "Linux packaging info" Apr. 21, 2006, (Pixelbeat.pdf).*
Carl Staelin, "A Software Packaging Tool", Dec. 6-11, 1998, Hewlett-Packard Laboratories, (Staelin.pdf).*
Christopher B. Browne, "Linux System Configuration Tools", Jan. 29, 2006, (Browne.pdf).*
Mitch Tulloch, "MSI Packaging Tools", Jan. 27, 2005, (MSI-Packaging_tool.pdf).*
Lameter, Christopher, "alien(1)-Linux man page", http://www.die.net/doc/linux/man/man1/alien.1.html, Feb. 20, 2007, 3 pages.
Layton, Jeff, "Cross-Platform Native Package Creation with EPM", http://www.samag.com/documents/s+9365/sam0312h/0312h.htm, Feb. 20, 2007, 8 pages.

* cited by examiner

*Primary Examiner* — Emerson Puente
*Assistant Examiner* — Hiren Patel
(74) *Attorney, Agent, or Firm* — Lowenstein Sandler PC

(57) ABSTRACT

A method and apparatus for cross-platform generation of new software packages. The method may include generating a list of software packages having a first format associated with a first operating system, generating new support files for entries on the list, and generating new software packages from the new support files and code of corresponding software packages. The new software packages are generated in the format associated with a second operating system.

17 Claims, 4 Drawing Sheets

CROSS-PLATFORM SOFTWARE PACKAGE GENERATION

TECHNICAL FIELD

Embodiments of the present invention relate to software packaging, and more specifically to cross-platform software package generation.

BACKGROUND

Package management systems and installers are used to automate the process of installing, updating, configuring and removing software packages from a computer. Package management systems are typically a part of an operating system, and use a single installation database such that users can verify and manage all packages on the system. An installer, on the other hand, is bundled with a particular software package and manages only that software package with which it is bundled.

A software package includes one or more files that are necessary to execute a computer program, or add features to a pre-installed program. In addition to software, packages also contain other important information such as the program name, a description of its purpose, the version number, and the vendor. Packages also often include a list of dependencies which identify other packages that are required for the software to run properly.

Software packages can be configured in many different package formats, depending on the operating systems on which they will be used. Many operating systems use standardized package formats that are native to that operating system, otherwise known as native software packages. The use of such native software packages is typically limited to a single operating system. Current mechanisms for re-packaging software into a format supporting a different operating system are cumbersome to use and require significant user interaction.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
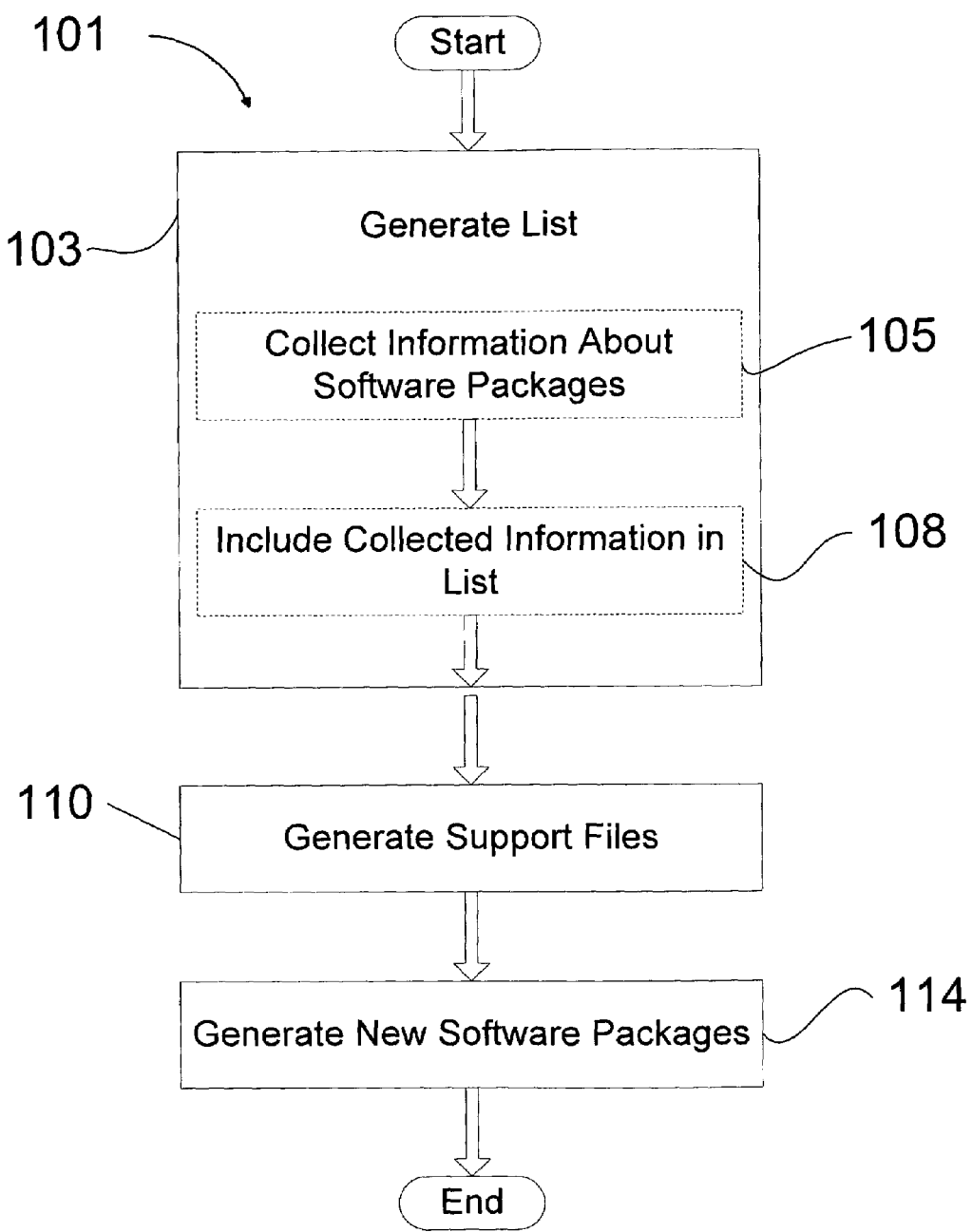
FIG. 1 illustrates a flow diagram of one embodiment of a method for performing a cross-platform software package generation.

Described herein is a method and apparatus for generating software packages. In one embodiment, a list of software packages having a first format associated with a first operating system is generated. For each software package in the list, new support files are automatically generated. The new support files are automatically combined with code of corresponding software packages to generate new software packages in a second format associated with a second operating system.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a method 101 for performing a cross-platform software package generation. The method may be performed by processing logic that may comprise hardware (e.g., circuitry, dedicated logic, programmable logic, microcode, etc.), software (such as instructions run on a processing device), or a combination thereof. In one embodiment, method 101 is performed by conversion modules discussed below in conjunction with FIG. 3.

At block 103, a list of software packages is generated from software packages used with a first operating system. The first operating system may be, for example, Linux, Windows, Solaris, OS-X, IRIX, HP-UX, etc. In one embodiment, the list of software packages is included in a text file. The software packages may be in a native software package format of the first operating system. Examples of native software package formats include RPM Package Manager (RPM) packages, Debian Package (DEB) packages, Windows Installer (MSI) packages, and Solaris datastream package (PKG) packages.

Software packages may include code and other information. In particular, software packages may contain source code, executable files and support files that are necessary for the execution of a computer program. Support files may include additional information pertaining to the package such as a package name, a package description, a package version number, a package release number, a package vendor, dependencies, ownership information, location information, etc. The number, type and contents of support files differ between native software package formats. For example, the datastream packages used on the Solaris operating system may include a package prototype file that contains ownerships and permissions, and a package info file that contains a package description. In contrast, the RPM packages used on some Linux operating systems may include a spec file that contains the package description, lists of the files included in the package and lists of third-party applications that need to be installed.

Alternatively, for some packages, the additional information discussed above may be included in the header of a software package, in executable files within the software package, or in the combination of the package header, the executable files and/or the support file(s).

In one embodiment, the list of software packages generated at block 103 includes a separate entry for each software package present in a data store managed by the first operating system. The data store may be a local repository or a remote repository accessible over a network (e.g., a local area network (LAN), a wide area network (WAN), etc.). In an alternative embodiment, the list includes only software packages chosen based on particular selection criteria. The selection criteria can include, for example, software package name, package size, a time stamp, package content, etc.

Referring back to FIG. 1, in one embodiment, processing logic generates the list of software packages by collecting information about the software packages (block 105), and including the collected information in the list (block 108). For each software package in the list, the information may include, for example, the package name, a summary or description of the package, a package version number, a package release number, a package vendor, etc. This information can be collected from the support files, the executable files, the header of the software package, or any combination of the above.

At block 110, processing logic generates one or more new support files for use with a second operating system. The second operating system is different from the first operating system and may be, for example, Linux, Windows, Solaris, OS-X, IRIX, HP-UX, etc. The new support files may be generated for each software package in the list created for the first operating system, and may include information extracted from the list and/or the contents of the software package. One embodiment of a method for creating new support files will be discussed in more detail below in conjunction with FIG. 2.

At block 114, processing logic automatically generates new software packages for the second operating system by combining the new support files and code (e.g., executable files) from the software packages associated with the first operating system. The new software packages have a native software package format of the second operating system. In one embodiment, the new support files and the new software packages associated with the second operating system are generated without user interaction, as will be discussed in more detail below in conjunction with FIG. 2.

Figure 2:
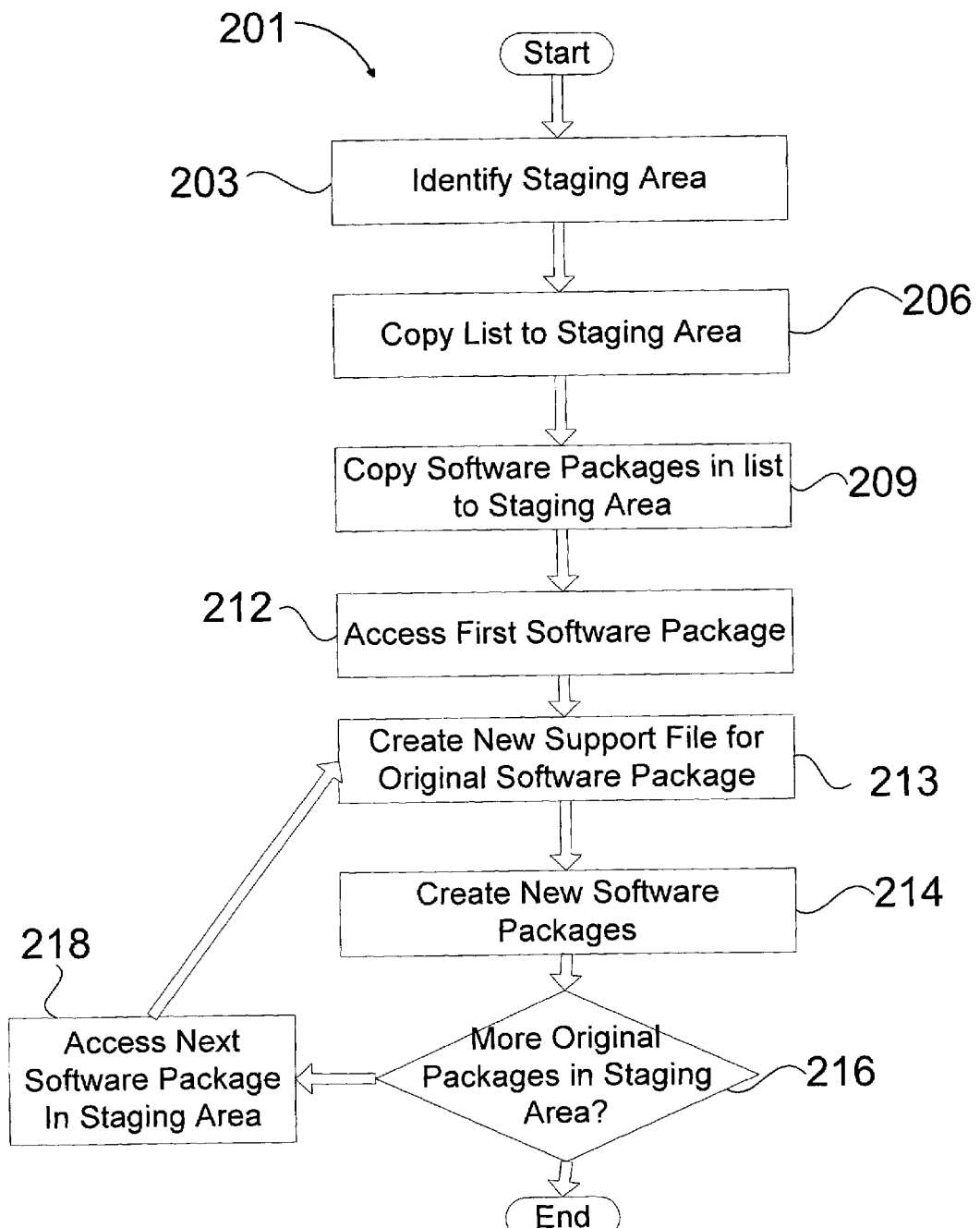
FIG. 2 illustrates a flow diagram of one embodiment of a method for generating support files and generating new software packages.

FIG. 2 illustrates a flow diagram showing a method 201 of generating support files and new software packages, in accordance with one embodiment of the present invention. The method may be performed by processing logic that may comprise hardware (e.g., circuitry, dedicated logic, programmable logic, microcode, etc.), software (such as instructions run on a processing device), or a combination thereof. In one embodiment, method 201 is performed by a conversion module 325 discussed below in conjunction with FIG. 3.

Referring to FIG. 2, method 201 begins with identifying a staging area (block 203). Identifying a staging area may include allocating memory and/or system resources associated with the second operating system.

At block 206, processing logic copies a list of original software packages associated with the first operating system (e.g., a list created at block 103 of FIG. 1) to the staging area. At block 209, processing logic copies the software packages identified in the list from a data store maintained by the first operating system to the staging area. In one embodiment, processing logic only copies software packages that have platform independent code. Examples of platform independent code include java byte code, source code, perl scripts, shell scripts, XML and text files. Processing logic may select software packages having platform independent code by examining code type information included in the list for each software package. Alternatively, processing logic selects software packages to be copied using predefined selection criteria (e.g., based on package name, package size, a time stamp, package content, etc.).

Each software package may have a time stamp. Time stamps can be used to facilitate package conversions for software updates and new software by reducing the number of packages that need to be converted. The time stamp can indicate when a software package was created, when it was last modified, and so on. In one embodiment, only those software packages that have a time stamp that falls within a specified range are included in the list. In an alternative embodiment, the list includes all available software packages, but new software packages are generated only for software packages on the list that have a time stamp that falls within a specified range.

In another embodiment, processing logic does not use the staging area, and the software packages are selected from their original location (e.g., a data store maintained by the first operating system).

At block 212, processing logic accesses the first original package in the staging area to obtain information needed for support files required by a packaging format used by the second operating system. In one embodiment, processing logic accesses the original software package with a package access tool associated with a packaging format used by the first operating system. A package access tool may be an existing tool installed on the second operating system. For example, Solaris may use a tool known as rpm2cpio to open RPM packages native to Linux.

The information to be obtained from the first original package depends on the support files required by the packaging format used by the second operating system. The number and type of the support files, and the information to be included in each support file, vary for different software package formats. For example, if the second operating system uses a datastream packaging format, then a prototype file and an info file are required. The information for the prototype file includes ownerships, permissions and file locations. The information for the info file includes the new software package name, version number, release number, and a summary. Information for both the prototype file and info file can be obtained from the list, the original support files, and/or the original software package header. Additional files may also be required, such as a dependency file, an installation check file, and an installation sequence file. The information for the dependency file includes all dependencies to be used by a new software package. The information for the installation check file includes a test or sequence of tests to run before installation to verify that a package installation will be successful. The information for the installation sequence file includes the sequence with which to install the contents of the new software package.

In another example, if the second operating system uses a software distributor (SD) package format (software package format used on HP-UX), then a product specification file (.psf file) is a necessary support file. The information for a .psf file includes dependency information, package description, and compatibilities, which can be obtained from the list, the original support files, and/or the original software package header.

At block 213, processing logic creates new support files for the first package in the staging area based on the information obtained at block 212. Once the new support files have been generated, they are combined with code from the original software package to generate a new software package (block 214). In one embodiment, new support files and new software packages are generated for each software package in the staging area automatically without user interaction.

In one embodiment, processing logic packages the new software package with a software packaging tool. Packaging tools bundle source code, executable files, support files, and any additional files into a software package. Additional files can include, for example, documentation, graphic files, etc.

Most operating systems have a software packaging tool that is used to generate packages of the native software package format for that operating system. Examples of such packaging tools are pkgmk for Solaris, swpackage for HP-UX and rpmbuild for Linux. Alternatively, some software packaging tools can generate packages in multiple package formats that are not necessarily the native package format of the operating system on which they operate.

At block 216, processing logic determines whether the staging area has any original software packages that have not been processed yet. If there are no unprocessed software packages remaining, method 201 ends. If unprocessed software packages do remain, processing logic accesses the next software package in the staging area (block 218) and proceeds to block 213.

In one embodiment, processing logic uses translation files that facilitate the generation of support files and new software packages. Translation files may contain dependency information and/or file naming rules for the first operating system and the second operating system. Processing logic uses the translation files to automatically change the names and the dependencies of the software package from a convention or format followed by the first operating system to a convention or format followed by the second operating system. For example, file names may be up to 256 characters long in the format used by the first operating system, and up to 32 characters long in the format used by the second operating system. In such an instance, the translation file would include a rule to modify all names that are over 32 characters long so that they meet the 32 character length requirement of the format used by the second operating system. The translation file can be, for example, a text file, a Perl file, a shell script, etc.

Where a translation file contains dependency information, this information may be used to generate a dependency support file. Like naming conventions, dependency information differs between systems. For example, an original software package and a new software package may both contain a file that depends on java. However, this dependency might be presented in different ways. In the first software package, the code may depend on javal, and in the second software package, the code may depend on ex java.run. The translation file includes a rule to change each dependency on javal encountered in the original software package to a dependency on ex java.run in the new software package. Thereby, dependencies can be maintained across different operating systems and different package formats.

In one embodiment, dependency rules and naming conventions followed by the first operating system and by the second operating system are integrated into the processing logic. Thereby, processing logic can automatically change the names and the dependencies of the software package from a convention or format followed by the first operating system to a convention or format followed by the second operating system without the use of translation files.

Figure 3:
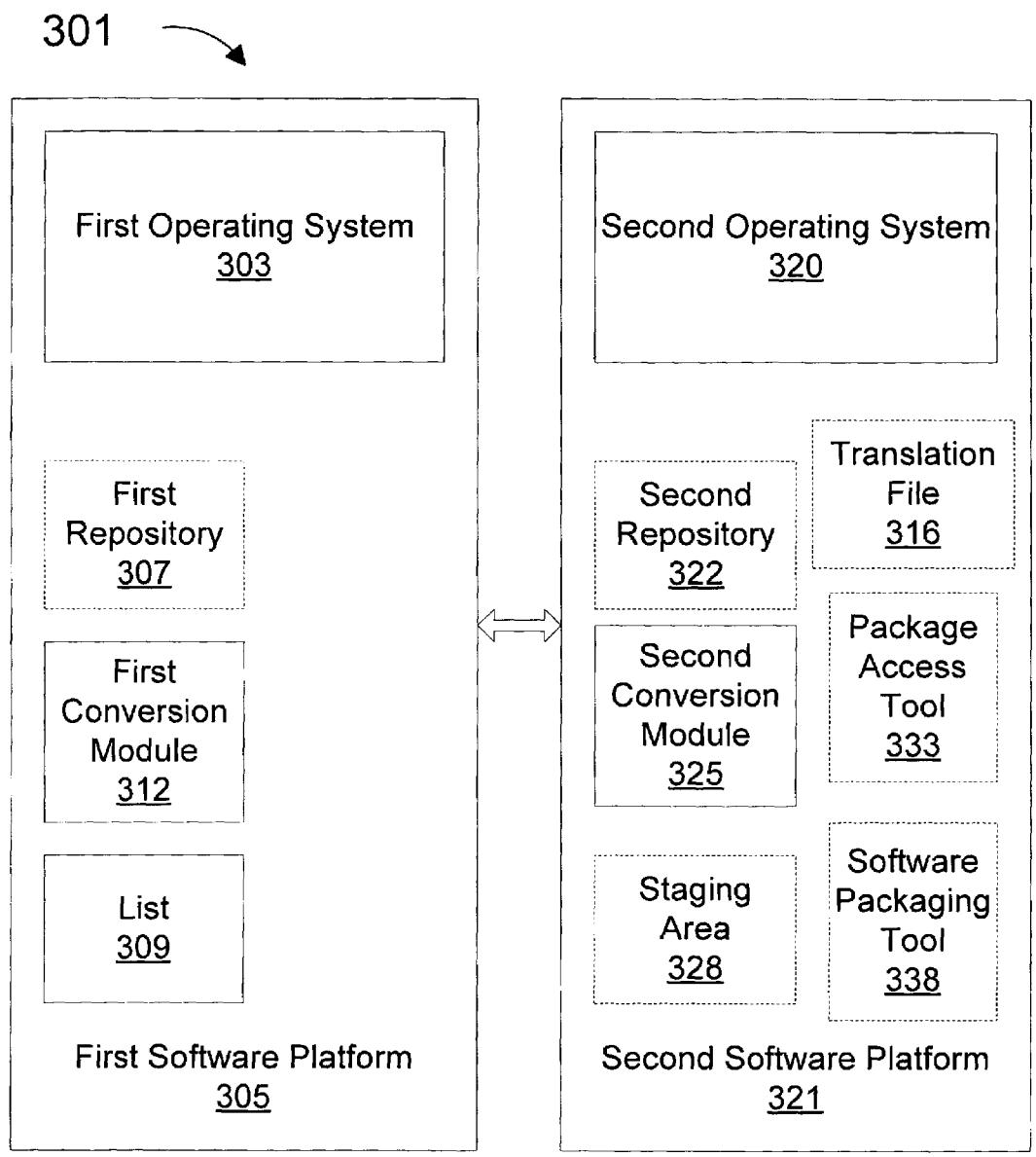
FIG. 3 illustrates a block diagram of one embodiment of a system for converting software packages.

FIG. 3 illustrates a block diagram of an apparatus 301 for generating new software packages, in accordance with one embodiment of the present invention. The apparatus 301 comprises a first software platform 305 with a first operating system 303 and a second software platform 321 with a second operating system 320. In some embodiments, the software platforms 305 and 321 run on two independent machines having the same or different hardware platform architectures such as x86, PA-RISC, and SPARC. The two machines may be connected directly or via a network. In other embodiments, the platforms 305 and 321 run on the same physical machine having a host operating system (not shown) and guest operating systems 303 and 320.

The first software platform 305 includes a first conversion module 312. The first conversion module 312 is responsible for generating a list 309 of software packages stored in a first repository 307. The illustrated embodiment shows a first repository 307 on the first platform 305. Alternatively, the first repository 307 may be located externally and accessed by the conversion module 312 via a network.

The first conversion module 312 is responsible for generating a list 309 that may contain an entry for each software package in the first repository 307 or for only some software packages in the first repository 307 chosen based on predefined selection criteria. The selection criteria may include, for example, software package name, package size, a time stamp, architecture dependency of software package files, etc. In one embodiment, the first conversion module 312 adds additional information for each entry in the list 306. This additional information may include, for example, a package name, a package description, a package version number, a package release number, a package vendor, dependencies, ownership information, location information, etc. In one embodiment, the first conversion module 312 stores the list 309 in the first repository 307.

The second software platform 321 includes a second operating system 320 and a second conversion module 325. The second conversion module 325 is responsible for generating one or more new support files for each software package in the list 309, or only for software packages in the list 309 chosen based on predefined selection criteria (e.g., based on software package name, package size, a time stamp, architecture dependency of package files, etc.). In addition, the second conversion module 325 is responsible for combining the new support files with the code of corresponding software packages to generate new software packages. The new software packages are generated in a second format associated with the second operating system 320.

In one embodiment, the second conversion module 325 uses a staging area 328 to generate new support files and create new software packages. In particular, the second conversion module 325 copies the list 309 and all or some software packages on the list 309 (e.g., those that include platform independent code) to the staging area 328. The staging area 328 may reside on the same machine as the second software platform 321 or be located externally and accessed via a network.

The second conversion module 325 accesses each software package in the staging area 328 to obtain information needed for creating new support files. In one embodiment, the second conversion module 325 uses a package access tool 333 to access the software packages in the staging area 328 that have a format associated with the first operating system 303. The package access tool 333 may be specifically designated for use with the packaging format associated with the first operating system 303.

In one embodiment, the second conversion module 325 uses a translation file 316 to perform renaming for files and dependencies of the original software packages stored in the staging area 328 in accordance with the requirements of the packaging format used by the second operating system 320. As was discussed in greater detail above, the translation file 316 may also facilitate the creation of dependency support files.

In alternative embodiments, the second conversion module 325 may not use the staging area 328 and may process the original software packages directly from the first repository 307.

In one embodiment, the second conversion module 325 uses a software packaging tool 338 to bundle up executable files from the original software packages along with corresponding new support files to generate new software packages.

The second conversion module 325 can store new software packages in a second repository 322 that may reside on the same machine as the second operating system 320 or externally.

Figure 4:
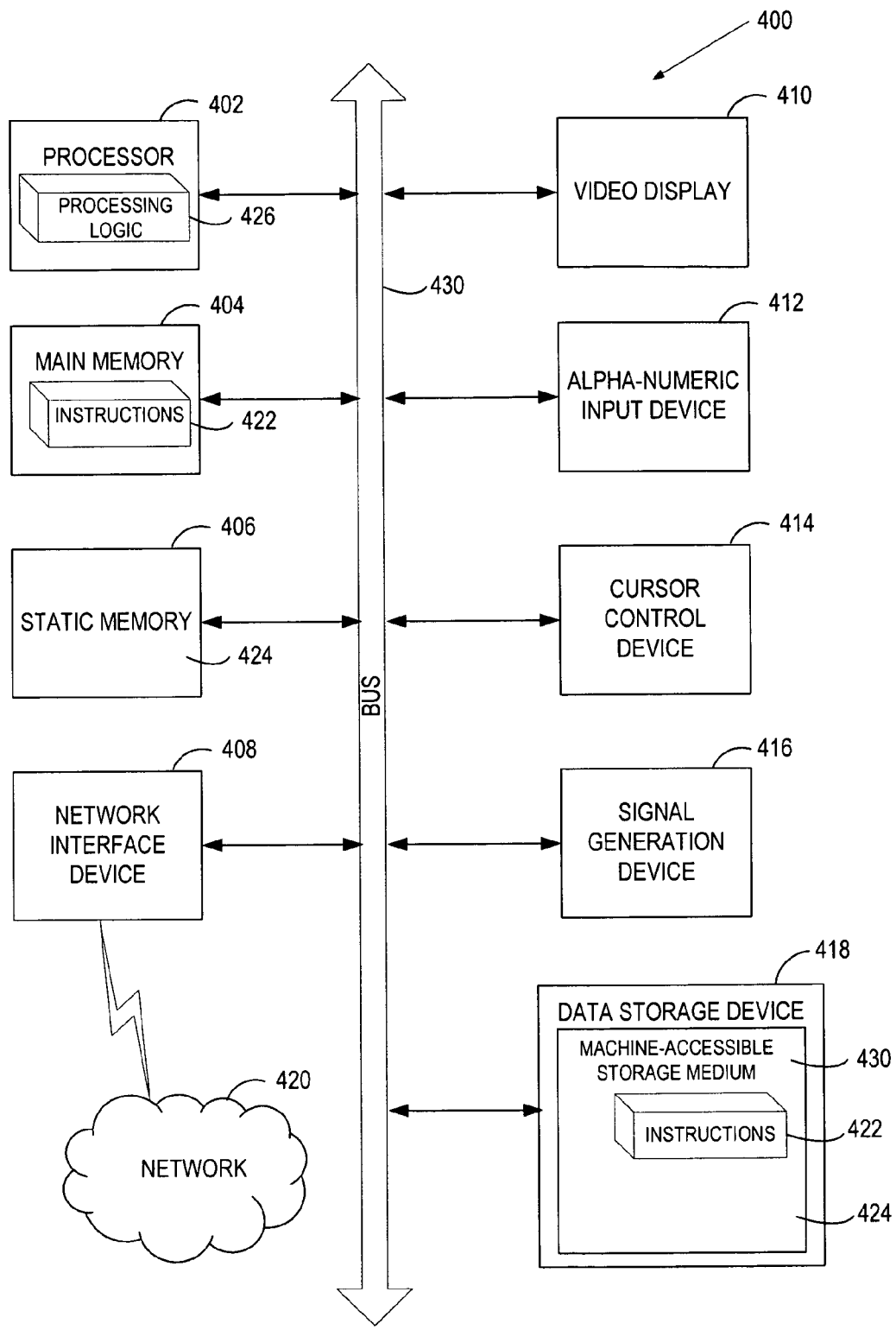
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for creating new software packages in a second package format from original software packages in a first package format have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
on a first operating system, generating a list of a plurality of software packages stored in a data store managed by the first operating system, each of the plurality of software packages having a first format associated with the first operating system, wherein the list comprises a separate entry in the list for each of the plurality of software packages;
accessing support files of the plurality of software packages with a package access tool of a second operating system, wherein the package access tool uses a second format associated with the second operating system, wherein the second format is different than the first format, and wherein the second operating system is different than the first operating system, wherein the support files comprise at least one of a package name, a package description, a list of files included in the respective software package or a list of third-party applications that need to be installed;

using the package access tool, obtaining information from at least one of the support files, the list, or a software package header based on a requirement of the second format;

generating a translation file comprising dependency information and file naming rules for the first operating system and the second operating system; and for each of the plurality of software packages in the list,
automatically generating one or more new support files on the second operating system using the obtained information and the translation file,
for each of the software packages that includes architecture independent code, generating a dependency support file, and
automatically combining the new support files and code of a corresponding one of the plurality of software packages to generate one or more new software packages in the second format on the second operating system.

2. The method of claim 1, further comprising automatically renaming the one or more new software packages and their contents according to the second format.

3. The method of claim 1, wherein generating the one or more new support files and combining the new support files with code comprises:
identifying a staging area;
copying the list to the staging area; and
copying each of the software packages that include the architecture independent code to the staging area.

4. The method of claim 1, wherein generating the one or more new support files and combining the new support files with code comprises packaging the one or more new software packages with a software packaging tool.

5. The method of claim 1, wherein generating the list of software packages comprises:
accessing each of the plurality of software packages to collect information; and
including the collected information in the list.

6. The method of claim 5, wherein the collected information includes at least one of a package name, a package description, a package version number, a package release number, or a package vendor.

7. The method of claim 1, wherein the list is included in a text file.

8. The method of claim 1, wherein the software packages comprise at least one of java byte code, source code, perl scripts, shell scripts, XML and text files.

9. The method of claim 1, further comprising:
for each of the software packages, identifying a time stamp associated with the software package; and
generating the list of software packages from software packages associated with particular time stamps.

10. The method of claim 1, wherein:
the first operating system is a Linux operating system; and
the first format is an RPM package format.

11. The method of claim 1, wherein:
the second operating system is a Solaris operating system; and
the second format is a datastream package format.

12. A non-transitory machine-accessible storage medium including data that, when accessed by a machine, cause the machine to perform a method comprising:

on a first operating system, generating a list of a plurality of software packages stored in a data store managed by the first operating system, each of the plurality of software packages having a first format associated with the first operating system, wherein the list comprises a separate entry in the list for each of the plurality of software packages;

accessing support files of the plurality of software packages with a package access tool of a second operating system, wherein the package access tool uses a second format associated with the second operating system, wherein the second format is different than the first format, and wherein the second operating system is different than the first operating system, wherein the support files comprise at least one of a package name, a package description, a list of files included in the respective software package, or a list of third-party applications that need to be installed;

using the package access tool, obtaining information from at least one of the support files, the list, or a software package header based on a requirement of the second format;

generating a translation file comprising dependency information and file naming rules for the first operating system and the second operating system; and for each of the plurality of software packages,
automatically generating one or more new support files on the second operating system using the obtained information and the translation file,
for each of the software packages that includes architecture independent code, generating a dependency support file, and
automatically combining the new support files and code of a corresponding one of the plurality of software packages to generate one or more new software packages in the second format on the second operating system.

13. The machine-accessible medium of claim 12, wherein generating the one or more new support files and combining the one or more new support files with code comprises:
identifying a staging area;
copying the list to the staging area; and
copying each of the software packages that include the architecture independent code to the staging area.

14. The machine-accessible medium of claim 12, wherein:
the first operating system is a Linux operating system;
the first format is an RPM package format;
the second operating system is a Solaris operating system; and
the second format is a datastream package format.

15. An apparatus comprising:
a data storage device to store data associated with a plurality of software packages; and
a processing device, coupled to the data storage device, the processing device comprising:
a first conversion module to generate a list of the plurality of software packages stored in the data storage device, each of the plurality of software packages having a first format associated with a first operating system, wherein the list of the plurality of software packages include a separate entry in the list for each of the plurality of software packages, and wherein the list of the plurality of software packages is generated on the first operating system;
a package access tool, using a second format associated with a second operating system, configured to access support files software packages, and to obtain information from at least one of the support files, the list, or a software package header based on a requirement of the second format, wherein the second format is different than the first format, and wherein the second operating system is different than the first operating system, wherein the support files comprise at least one of a package name, a package description, a list of files included in the respective software package, or a list of third-party applications that need to be installed;

a first conversion module to generate a translation file comprising dependency information and file naming rules for the first operating system and the second operating system; and a second conversion module to generate, for each of the plurality of software packages, one or more new support files using the obtained information and the translation file, to generate, for each of the software packages that includes architecture independent code, a dependency support file, and to combine the one or more new support files and code of corresponding one of the plurality of software packages to generate one or more new software packages in the second format on the second operating system, and wherein the second conversion module is configured to generate and combine the one or more new support files with the code without user interaction.

16. The apparatus of claim 15, further comprising a staging area, on which to place a copy of the list and a copy of each of the software packages that includes the architecture independent code.

17. The apparatus of claim 15, wherein the processing device further comprises a software packaging tool to package the one or more new software packages.

* * * * *